(12) United States Patent
Rosenberg

(10) Patent No.: US 6,906,697 B2
(45) Date of Patent: Jun. 14, 2005

(54) HAPTIC SENSATIONS FOR TACTILE FEEDBACK INTERFACE DEVICES

(75) Inventor: Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 157 days.

(21) Appl. No.: 09/927,415

(22) Filed: Aug. 10, 2001

(65) Prior Publication Data

US 2002/0084982 A1 Jul. 4, 2002

Related U.S. Application Data

(60) Provisional application No. 60/224,584, filed on Aug. 11, 2000, and provisional application No. 60/231,844, filed on Sep. 11, 2000.

(51) Int. Cl.[7] .................................................. G09G 5/00
(52) U.S. Cl. ........................ 345/156; 345/157; 345/701; 345/702; 709/203
(58) Field of Search ................................. 345/156, 157, 345/701, 161, 700, 702; 709/203

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Culter |
| 3,497,668 A | 2/1970 | Hirsch |
| 3,517,446 A | 6/1970 | Corlyon et al. |

(Continued)

FOREIGN PATENT DOCUMENTS

| | | |
|---|---|---|
| EP | 0 349 086 A1 | 1/1990 |
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State-of-the-Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, Vol. 79, No. 1, pp. 150–156, 1990.

(Continued)

*Primary Examiner*—Amare Mengistu
(74) *Attorney, Agent, or Firm*—Thelen Reid & Priest LLP; David B. Ritchie

(57) ABSTRACT

Haptic sensations for tactile feedback computer interface devices. In one method, a tactile sensation is output during the interaction of a cursor and a graphical object, the tactile sensation being based on a periodic waveform and having a frequency correlated with a size of the graphical object interacted with the cursor. Another method includes receiving an indication of a position of a cursor, causing the cursor to snap to a graphical object, such as a line, when the cursor is within a predetermined distance so that the cursor can be moved along or within the graphical object, and enabling the output of a vibration sensation while the cursor is moved along or within the object. In another method, a tactile sensation includes a pop sensation that is a short, high magnitude sensation, and then a ringing sensation during or immediately after the output of the pop sensation and which can fade in magnitude over time.

31 Claims, 5 Drawing Sheets

U.S. PATENT DOCUMENTS

| | | |
|---|---|---|
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 4,127,752 A | 11/1978 | Lowthorp |
| 4,160,508 A | 7/1979 | Frosch |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,787,051 A | 11/1988 | Olson |
| 4,794,392 A | 12/1988 | Selinko |
| 4,795,296 A | 1/1989 | Jau |
| 4,868,549 A | 9/1989 | Affinito et al. |
| 4,885,565 A | 12/1989 | Embach |
| 4,891,764 A | 1/1990 | McIntosh |
| 4,896,554 A | 1/1990 | Culver |
| 4,930,770 A | 6/1990 | Baker |
| 4,934,694 A | 6/1990 | McIntosh |
| 4,949,119 A | 8/1990 | Moncrief et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,078,152 A | 1/1992 | Bond et al. |
| 5,107,262 A | 4/1992 | Cadoz et al. |
| 5,146,566 A | 9/1992 | Hollis, Jr. et al. |
| 5,165,897 A | 11/1992 | Johnson |
| 5,175,459 A | 12/1992 | Danial et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,203,563 A | 4/1993 | Loper, III |
| 5,212,473 A | 5/1993 | Louis |
| 5,220,260 A | 6/1993 | Schuler |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,355,148 A | 10/1994 | Anderson |
| 5,388,992 A | 2/1995 | Franklin et al. |
| 5,399,091 A | 3/1995 | Mitsumoto |
| 5,405,152 A | 4/1995 | Katanics et al. |
| 5,414,337 A | 5/1995 | Schuler |
| 5,436,622 A | 7/1995 | Gutman et al. |
| 5,437,607 A | 8/1995 | Taylor |
| 5,451,924 A | 9/1995 | Massimino et al. |
| 5,466,213 A | 11/1995 | Hogan et al. |
| 5,506,605 A | 4/1996 | Paley |
| 5,542,672 A | 8/1996 | Meredith |
| 5,547,382 A | 8/1996 | Yamasaki et al. |
| 5,550,562 A | 8/1996 | Aoki et al. |
| 5,565,840 A | 10/1996 | Thorner et al. |
| 5,575,761 A | 11/1996 | Hajianpour |
| 5,583,478 A | 12/1996 | Renzi |
| 5,589,828 A | 12/1996 | Armstrong |
| 5,589,854 A | 12/1996 | Tsai |
| 5,625,576 A | 4/1997 | Massie et al. |
| 5,629,594 A | 5/1997 | Jacobus et al. |
| 5,643,087 A | 7/1997 | Marcus et al. |
| 5,666,138 A | 9/1997 | Culver |
| 5,684,722 A | 11/1997 | Thorner et al. |
| 5,690,582 A | 11/1997 | Ulrich et al. |
| 5,696,537 A | 12/1997 | Solhjell |
| 5,709,219 A | 1/1998 | Chen et al. |
| 5,714,978 A | 2/1998 | Yamanaka et al. |
| 5,734,373 A | 3/1998 | Rosenberg et al. |
| 5,736,978 A | 4/1998 | Hasser et al. |
| 5,742,278 A | 4/1998 | Chen et al. |
| 5,754,023 A | 5/1998 | Roston et al. |
| 5,766,016 A | 6/1998 | Sinclair et al. |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,802,353 A | 9/1998 | Avila et al. |
| 5,825,308 A | 10/1998 | Rosenberg |
| 5,844,392 A | 12/1998 | Peurach et al. |
| 5,857,986 A | 1/1999 | Moriyasu |
| 5,880,714 A | 3/1999 | Rosenberg et al. |
| 5,889,672 A | 3/1999 | Schuler et al. |
| 5,897,437 A | 4/1999 | Nishiumi et al. |
| 5,914,705 A | 6/1999 | Johnson et al. |
| 5,944,151 A | 8/1999 | Jakobs et al. |
| 5,956,484 A | 9/1999 | Rosenberg et al. |
| 5,959,613 A | 9/1999 | Rosenberg et al. |
| 5,973,689 A | 10/1999 | Gallery |
| 5,986,643 A | 11/1999 | Harvill et al. |
| 5,990,869 A | 11/1999 | Kubica et al. |
| 6,001,014 A | 12/1999 | Ogata et al. |
| 6,004,134 A | 12/1999 | Marcus et al. |
| 6,005,551 A | 12/1999 | Osborne et al. |
| 6,020,876 A | 2/2000 | Rosenberg et al. |
| 6,028,593 A | 2/2000 | Rosenberg et al. |
| 6,061,004 A | 5/2000 | Rosenberg |
| 6,078,038 A | 6/2000 | Cooper |
| 6,088,017 A | 7/2000 | Tremblay et al. |
| 6,088,019 A * | 7/2000 | Rosenberg ................. 345/156 |
| 6,100,874 A | 8/2000 | Schena et al. |
| 6,111,577 A | 8/2000 | Zilles et al. |
| 6,160,489 A | 12/2000 | Perry et al. |
| 6,211,861 B1 | 4/2001 | Rosenberg et al. |
| 6,219,034 B1 | 4/2001 | Elbing |
| 6,353,427 B1 * | 3/2002 | Rosenberg ................. 345/156 |
| 6,373,463 B1 | 4/2002 | Beeks |
| 6,411,276 B1 * | 6/2002 | Braun et al. ................ 345/156 |
| 6,422,941 B1 | 7/2002 | Thorner et al. |
| 6,448,977 B1 * | 9/2002 | Braun et al. ................ 345/701 |
| 2002/0024501 A1 | 2/2002 | Shalit |

OTHER PUBLICATIONS

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050-4729/93, pp. 955–960, 1993.

Adelstein et al., "Design and Implementation of a Force Reflecting Manipulandum for Manual Control research," DSC– vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–Vol. 42, *Advances in Robotics*, pp.63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al, "Design and Testing of A Non–reactive, Fingertip, Tactile Display for Interaction with Remote Environments,." *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings Of Fourth CISM–IFToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation." *SOAR '89 Workshop, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No.3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design at A Force–Feedback Touch–Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical–to–Tactile Image Conversion for the Blind," *IEEE Transactions on Man–Machine Systems*, vol. MMS–11, No. 1, Mar. 1970.

Johnson, "Shape–Memory Alloy Tactile Feedback Actuator," *Armstrong Aerospace Medical Research Laboratory*, AAMRL–TR–90–039, Aug., 1990.

Kontarinis et al., "Tactile Display of Vibratory Information in Teleoperation and Virtual Environments," PRESENCE, 4(4):387–402, Harvard Univ., 1995.

Aukstakalnis et al., "Silicon Mirage: The Art and Science of Virtual Reality," ISBN 0–938151–82–7, pp. 129–180, 1992.

Eberhardt et al., "Introducing Dynamic Haptic Perception by The Hand: System Description and Some Results," DSC–vol. 55–1, *Dynamic Systems and Control:* vol. 1, ASME 1994.

Gobel et al., "Tactile Feedback Applied to Computer Mice," *International Journal of Human–Computer Interaction*, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," *Logitech Cyberman SWIFT Supplement to Logitech Mouse Technical Reference and Programming Guide*. Apr. 5, 1994.

Ouhyoung et al., "The Development of A Low–Cost Force Feedback Joystick and its Use in the Virtual Reality Environment.," *Proceedings of the Third Pacific Conference on Computer Graphics and Applications, Pacific Graphics '95*, Seoul, Korea, Aug. 21–24, 1995.

Kaczmarek et al., "Tactile Displays," *Virtual Environment Technologies*, Chap. 9, pp. 349–414.

Lake, "Cyberman from Logitech," at http://www.ibiblio.org/GameBytes/Issue21/greviews/cyberman.html, 1994.

"Component Maintenance Manual With Illustrated Parts List, Coaxial Control Shaker Part No. C–25502" Safe Flight Instrument Corporation, Revised Jan. 28, 2002 (3 pages).

"Technical Manual Overhaul Instructions With Parts Breakdown, Coaxial Control Shaker Part No. C–25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele–Virtual Reality of Dynamic Mechanical Model," *Proceedings of the 1992 IEEE/RSJ International Conference on Intelligent Robots and Systems*, Raleigh, NC, Jul. 7–10, 1992.

Noll, "Man–Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

* cited by examiner

HAPTIC SENSATIONS FOR TACTILE FEEDBACK INTERFACE DEVICES

CROSS REFERENCE TO RELATED APPLICATIONS

This application claims benefit of Provisional Patent Applications No. 60/224,584, filed Aug. 11, 2000 by L. Rosenberg, entitled, "Vibrotactile Interfacing with Graphical Objects," and No. 60/231,844, filed Sep. 11, 2000 by L. Rosenberg, entitled, "Vibrotactile Sensations for Displayed Graphical Objects," both of which are incorporated herein by reference for all purposes.

BACKGROUND OF THE INVENTION

The present invention relates generally to haptic feedback provided to humans when interfacing with computer systems, and more particularly to haptic sensations and computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user manipulandum through sensors provided on the interface device that send locative signals to the computer. For example, the computer displays a cursor or other graphical object in a graphical environment, where the location of the cursor is responsive to the motion of the user manipulandum.

In some interface devices, force feedback or tactile feedback is also provided to the user, more generally known herein as "haptic feedback." These types of interface devices can provide physical sensations which are felt by the user manipulating a user manipulandum of the interface device. One or more motors or other actuators are coupled to the joystick, mouse, or other device and are connected to the controlling computer system. In kinesthetic force feedback systems, the computer system controls forces on the movement of the joystick or mouse in conjunction and coordinated with displayed events and interactions by sending control signals or commands to the actuators. For example, the Logitech Wingman Force Feedback Mouse and the Logitech I-Feel Mouse allow a user to experience haptic sensations associated with interacting a cursor with graphical objects in a GUI or web page.

Low-cost haptic devices tend to provide tactile feedback, in which forces are transmitted to a housing or portion thereof and felt by the user, rather than kinesthetic feedback, in which forces are output directly in the degrees of freedom of motion of the interface device. For example, many currently-available gamepad controllers include a spinning motor with an eccentric mass, which outputs vibrations to the housing of the controller in coordination with events occurring in a game. In some haptic mouse devices, pins, buttons, or the housing of the mouse can be vibrated in accordance with interaction of a controlled cursor with other graphical objects, which the user feels by touching those housing areas. These tactile devices are typically less sophisticated than kinesthetic devices and therefore are much less expensive to produce.

One problem with such inexpensive haptic controllers is their limited ability to convey certain types of haptic sensations to the user. For example, most pure tactile mice are incapable of providing spring and damper sensations in the sensed degrees of freedom of the mouse. These types of devices tend to be limited in producing other spatially-based haptic sensations as well. This can limit the applicability of tactile mice to interfaces designed for kinesthetic force feedback devices. For example, many traditional interface elements, such as graphical objects in a graphical user interface, tend to be associated with spatially-based force sensations. Icons, for example, are often associated with attractive and/or repulsive forces, which apply a force on a mouse in its degrees of freedom to assist the user in cursor moving tasks. However, in a tactile mouse providing no such forces in the degrees of freedom of the mouse, such haptic sensations cannot be output. What is needed are haptic sensations to associate with graphical elements in interface tasks that are compelling and useful to a user of a tactile mouse or other tactile interface device.

SUMMARY OF THE INVENTION

The present invention presents different types of tactile sensations which can be used in a variety of applications to convey interesting and useful information to the user of a haptic feedback device.

More particularly, in a first method of the present invention for providing a haptic sensation to a user physically contacting a haptic feedback device, where the haptic feedback device communicates with a host computer implementing a graphical environment, the method includes receiving an indication of an interaction of a user-controlled cursor with a graphical object, and enabling the output of a tactile sensation during the interaction, the tactile sensation being based on a periodic waveform and having a frequency correlated with a size of the graphical object interacted with the cursor. The frequency of the tactile sensation can be correlated with a size of a collection of data associated with the graphical object, or correlated with a displayed size of the graphical object or other size characteristic. The interaction can be moving the cursor over the graphical object or dragging the graphical object. A magnitude or duration of the sensation can also be correlated the size of the graphical object.

In a different aspect of the present invention, a method for providing a haptic sensation to a user physically contacting a haptic feedback device includes receiving an indication of a position of a user-controlled cursor, causing the cursor to snap to the graphical object when the cursor is within a predetermined distance of the graphical object in the graphical environment so that the cursor is displayed touching the graphical object and the cursor can be moved along or within the graphical object based on user manipulation of the haptic feedback device, and enabling the output of a vibration sensation while the cursor is moved along or within the graphical object. The graphical object can be a line and the vibration can be enabled to be output when the cursor moves along the line. Input from the haptic feedback device based on user manipulation that would cause the cursor to move away from the graphical object can be ignored, for example, when the input designates cursor locations within a predetermined distance from the graphical object.

In a different aspect of the present invention, a method for providing a tactile sensation to a user physically contacting a haptic feedback device includes enabling the output of a pop sensation that is a short, high magnitude sensation, and enabling the output of a ringing sensation during or immediately after the output of the pop sensation. The ringing sensation is commanded using a periodic waveform and has a longer duration and lower magnitude than the pop sensation. The ringing sensation can fade in magnitude over time. The haptic sensation can be a rubbery sensation having a ringing sensation using a periodic waveform having a frequency of 125 to 200 Hz and a duration of about 200 milliseconds, or a metallic sensation having a ringing sensation with a frequency of 300 to 500 Hz and a duration of about 200 milliseconds.

The present invention provides a variety of compelling tactile sensations that can be used with a purely tactile feedback interface device. Since tactile devices are typically less complex and expensive to produce than kinesthetic force feedback devices, the tactile sensations presented herein advantageously extend the applicability and desirability of the less expensive tactile feedback devices.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
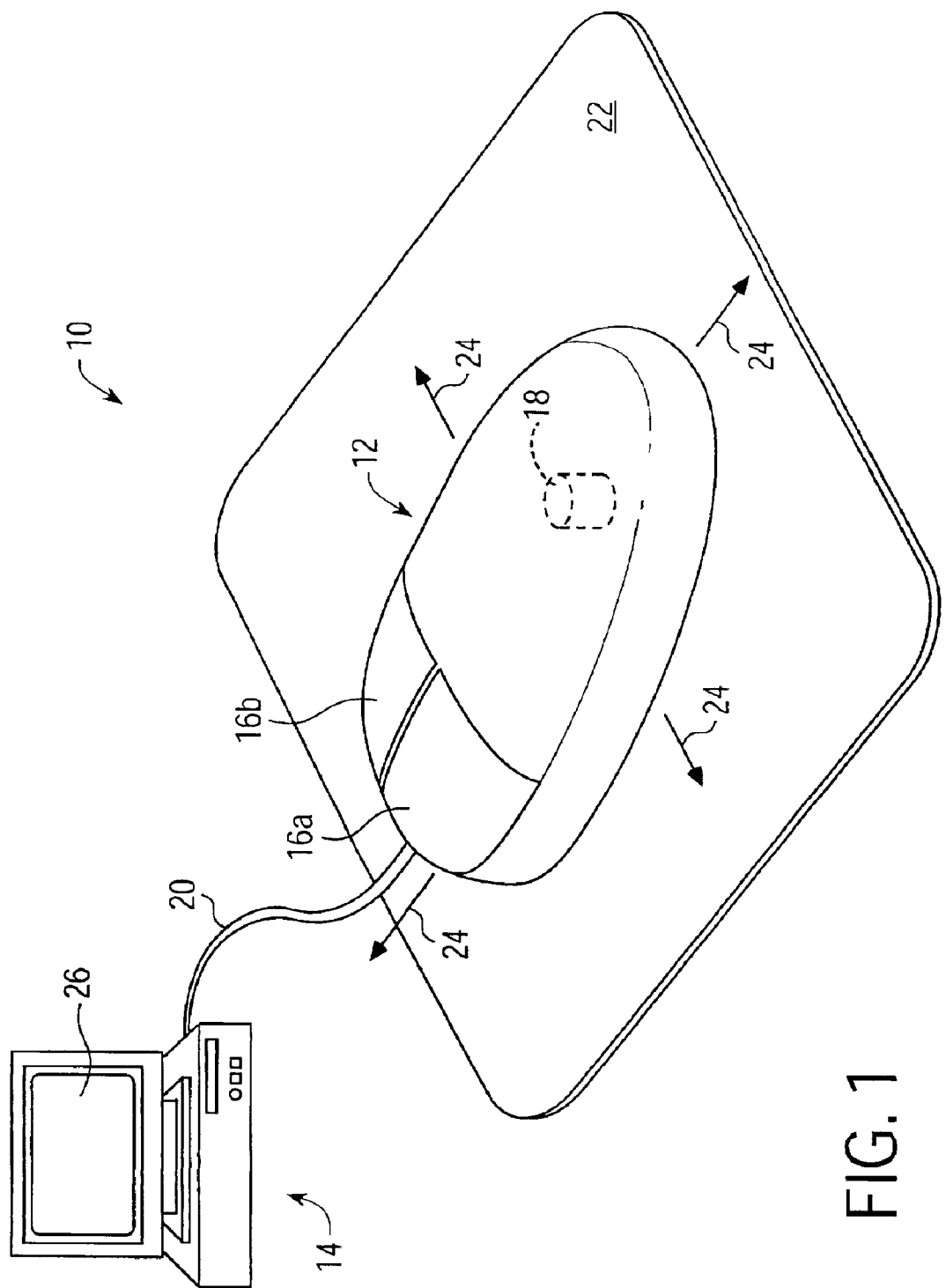
FIG. 1 is a perspective view of an example of a haptic feedback device and host computer suitable for use with the present invention.

FIG. 1 is a perspective view of a haptic feedback mouse interface system 10 suitable for use with the present invention and capable of providing input to a host computer based on the user's manipulation of the mouse and capable of providing haptic feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but can also be implemented as a grip, finger cradle, cylinder, sphere, planar object, etc.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system.

Mouse 12 preferably includes an actuator 18 which is operative to produce forces on the mouse 12. This operation is described in greater detail below with reference to FIG. 2.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A sensor system translates the planar motion of the mouse 12 into electrical position signals, which are sent to a host computer 14 over a bus 20 as is well known to those skilled in the art. Mouse 12 is preferably a "relative" device, which, as referenced herein, is a device that reports a change in position of the device to the host computer rather than an absolute position in a fixed reference frame.

Mouse 12 is coupled to the computer 14 by a bus 20, which communicates signals between mouse 12 and computer 14 and may also, in some preferred embodiments, provide power to the mouse 12. Components such as actuator 18 require power that can be supplied from an interface such as a USB or Firewire (IEEE 1394) bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries.

Host computer 14 is a computing device that can take a wide variety of forms. For example, computer 14 can be a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, Sony, or Microsoft. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Computer 14 can also be a portable computer or game device, arcade machine, vehicle computer, etc. Host computer preferably includes a host microprocessor, random access memory (RAM), read only memory (ROM), input/output (I/O) circuitry, disk drives, and other components of computers well-known to those skilled in the art.

Host computer 14 preferably implements a host application program with which a user is interacting via mouse 12 and other peripherals, if appropriate, and which may include force feedback functionality. For example, the host application program can be a drawing/CAD program, video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. The host application program checks for input signals derived from the electronics and sensors of mouse 12, and outputs force values and/or commands to be converted into forces output for mouse 12. Suitable software drivers which interface software with haptic feedback devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display graphical objects from a GUI and/or application program.

Mouse 12 can include a wide variety of architectures. For example, in some embodiments, the host computer 14 controls the output of actuators on the mouse 12 directly by streaming force values to the mouse 12. In other embodiments, a local microprocessor on the mouse 12 can receive high level commands from the host 14 and provide the force values to the actuator based on the host commands and local force processes. These implementations, and variations thereof, are described in copending application Ser. No. 09/456,887, filed Dec. 7, 1999, incorporated herein by reference.

In alternative embodiments, the mouse can be a different interface or control device. For example, a haptic feedback trackball, a hand-held remote control device, gamepad controller for video games or computer games, a knob, cellular phone, personal digital assistant, touchpad, stylus, joystick, steering wheel, etc. can be used with the present invention.

Figure 2:
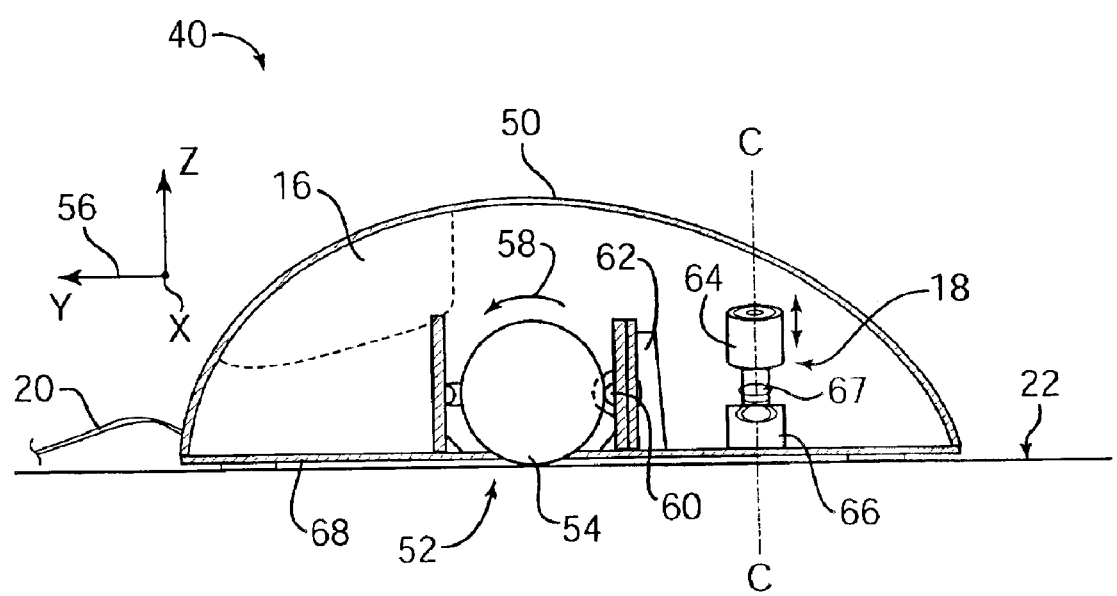
FIG. 2 is a side elevational view of an example implementation of the haptic mouse device shown in FIG. 1.

FIG. 2 is a side cross-sectional view of one embodiment 40 of mouse 12 of FIG. 1. Mouse 12 includes one or more actuators 18 for imparting haptic feedback such as tactile sensations to the user of the mouse. Suitable embodiments and mechanisms for use as a tactile mouse or other tactile pointing device (trackball, gamepad, joystick, stylus, etc.) are well known to those of skill in the art. For example, suitable embodiments for a tactile mouse are described in U.S. Pat. No. 6,211,861 and copending application Ser. Nos. 09/585,741 and 09/759,780, all incorporated herein by reference.

Mouse 12 includes a housing 50, a sensing system 52, and an actuator 18. Housing 50 is shaped to fit the user's hand like a standard mouse while the user moves the mouse in the planar degrees of freedom and manipulates the buttons 16. Other housing shapes can be provided in many different embodiments. Buttons 16 can be selected by the user as a "command gesture" when the user wishes to input a command signal to the host computer 14.

Sensing system 52 detects the position of the mouse in its planar degrees of freedom, e.g. along the X and Y axes. In the described embodiment, sensing system 52 includes a standard mouse ball 54 for providing directional input to the computer system. Ball 45 is a sphere that extends partially out the bottom surface of the mouse and rolls in a direction corresponding to the motion of the mouse on a planar surface 22. For example, when the mouse 12 is moved in a direction indicated by arrow 56 (y direction), the ball rotates in place in a direction shown by arrow 58. The ball motion can be tracked by a cylindrical roller 60 which is coupled to a sensor 62 for detecting the motion of the mouse. Sensor 62 be any of a variety of types of sensors, such as optical encoders, analog potentiometers, etc. A similar roller and sensor 28 can be used for the x-direction which is perpendicular to the y-axis. Other types of mechanisms and/or electronics for detecting planar motion of the mouse 12 can be used in other embodiments. For example, an optical sensor can be used to track mouse motion; a suitable optical mouse technology is made by Hewlett Packard of Palo Alto, Calif. and is used in, for example, the Intellimouse® Explorer or Intellimouse® with Intellieye™ mouse devices from Microsoft Corporation. Use of this sensor is described in greater detail in U.S. Pat. No. 6,211,861. Alternatively, a portion of an optical sensor can be built into the surface 22 (such as a pad) to detect the position of an emitter or transmitter in mouse 12 and thus detect the position of the mouse 12 on the surface 22.

An actuator 18 is coupled to the housing 50 to provide haptic feedback to the user. In one embodiment of the present invention, an actuator is coupled to an inertial mass that is moved by the actuator. The actuator is also coupled to the housing of the mouse such that inertial forces caused by the motion of the inertial mass with respect to an inertial ground are applied to the housing of the mouse, thereby conveying haptic feedback such as tactile sensations to the user of the mouse who is contacting the housing. Sensations can alternative or additionally be output with reference to an earth ground, e.g. by moving a portion of the housing against the user, as described in copending application Ser. No. 09/585,741. One embodiment 40 creates inertial forces that are directed substantially in a particular degree of freedom, i.e. along a particular axis. The inertial forces can be created, for example, using a high bandwidth linear actuator, such as a linear moving voice coil actuator and a linear moving-magnet actuator. A flexure or other mechanism can be used to convert rotary forces to substantially linear forces in a desired direction, such as along the Z-axis, orthogonal to the planar X and Y axes used for mouse motion and input.

In the described embodiment, actuator 18 can be a linear electromagnetic actuator having a stationary portion 66 coupled to the mouse housing 50 (and thus stationary only with respect to the portion of the mouse housing to which it is coupled), and a moving portion 67 that moves linearly approximately along the Z-axis. In the described embodiment, the stationary portion 66 includes a magnet and the moving portion 67 includes a wire coil. An inertial mass 64 is coupled to (or is integral to) the linearly-moving portion of the actuator. The actuator 18 is operative to oscillate the inertial mass 64 quickly along the axis C which is approximately parallel to the Z axis. Thus, inertial forces produced by the moving mass 64 are transmitted to the housing through the stationary portion 66 of the actuator 18 and felt by the user. These forces are substantially directed along the Z axis. Preferably, the mass has an origin position that is positioned between the extremes of the range of motion of the mass. In some embodiments, a spring compliance is built into the actuator or the mass so that the mass returns to the origin position when no forces are exerted on the mass by the actuator.

In other embodiments, moving surface tactile sensations can be conveyed to the user instead of inertial sensations. For example, a surface on the mouse, on a housing, a touchpad, or other contacted surface can be directly moved in the z-axis against the user's finger or palm. Or, the contacted surface can oscillated side-to-side in the x-y plane, conveying tactile sensations in shear on the user's skin. These types of tactile sensations can also be used with the present invention.

Actuator 18 can be a linear voice coil actuator as described in U.S. Pat. No. 6,243,078, which is incorporated herein by reference in its entirety. Alternatively, actuator 18 can be other types of actuators/mechanisms, such as a DC motor and flexure. A variety of tactile sensations can be output to the user, many of which are described in U.S. Pat. No. 6,211,861. A block diagram of a haptic feedback system, including local control such a microprocessor or host control, and which can be suitable for the present invention is described in U.S. Pat. Nos. 6,211,861, 6,243,078, and 5,825,308, all incorporated herein by reference in their entirety.

In addition, it is preferred that the mouse rest on a flexible or semi-flexible surface, such as a standard mouse pad. This type of flexible surface increases the transmissibility of the inertial forces from the actuator to the housing and allows the inertial sensations to be amplified, rather than countered by normal forces applied by a hard surface such as a table surface. An amount of flex can also be provided between the actuator-coupled portion of the mouse housing and the base portion 68 that is in contact with the surface 22 to improve the transmissibility of the tactile sensations.

Tactile Sensations

Tactile sensations applied to the user operating a tactile feedback interface device can take a variety of forms. Tactile sensations of the present invention which have been found to be particularly suitable for interface tasks, such as tasks within a graphical user interface or application program, are described below.

Any of the tactile sensations described below can be controlled by a driver program running on the host computer, by an application program or API on the host computer, or by the local microprocessor on the haptic feedback device, or by a combination of two or more of these. For example, a driver program on the host (at a lower level than the application program) can check when a cursor interacts with an object and cause the necessary commands to be output to implement a tactile sensation to the haptic device. Or, an application program on the host can command the haptic sensations directly. Alternatively, a local microprocessor or other controller can check cursor interactions and command sensations, as long as the local microprocessor has an up-to-date picture of the layout of the graphical environment, e.g. the host can send data to the microprocessor conveying this information.

Conveying a Sense of Object Size

In kinesthetic force feedback devices of the prior art, forces can be output in the degrees of freedom of the mouse. Thus, for example, a displayed icon can be associated with an attractive force, where forces are output in the direction of the icon to draw the mouse toward the icon.

In other situations, a sense of the size of a graphical object (or an associated collection of data) can be conveyed when the user uses the mouse to move the graphical object or move the cursor over the object. For example, in U.S. Pat. No. 6,219,032, incorporated herein by reference in its entirety, a user can move a cursor on some types of graphical objects and "drag" them, e.g. move the objects with the cursor while holding down a mouse button. In kinesthetic feedback devices, to make the objects feel as if they have weight, a force can be output in conjunction with the drag operation, such as an inertia force or resistance force in the opposite direction to the drag direction. To convey a size of the object, the magnitude of the force can be in proportion to the size of the object. Thus, a smaller graphical object will provide a smaller resistance force, while a larger graphical object provides a larger resistance force. The force magnitude can also or alternatively be indicative of a collection of data, program, or other quantity or feature associated with the graphical object. For example, the force for a folder can be proportional to the number of files stored within that folder, and/or proportional to the size (e.g. in bytes) of a file within that folder. In other kinesthetic force feedback embodiments, an attractive force can bias the device or manipulandum to move the cursor toward an object, and the attractive force magnitude can be scaled in proportion with the size of object or size of an associated characteristic.

Purely tactile mice, however, such as the embodiment described with reference to FIG. 2, cannot output forces in the degrees of freedom of the mouse and thus cannot output drag forces, inertia forces, attractive forces, or the like. However, haptic sensations can be output to convey to the user a size of graphical object which is being manipulated or moved over with the cursor.

Tactile sensations can be conveyed by commanding a periodic waveform to the actuator. For example, a sine wave that moves positive and negative can cause the actuator to move an inertial mass in positive and negative directions about an origin position, thereby conveying a vibration sensation. A square wave, triangle wave, sawtoothed-shaped wave, or other types of periodic waveforms can also be commanded. Many different types of vibration sensations and other sensations can be designed and output using such software tools and programs as Immersion Studio™ and Immersion Desktop™, available from Immersion Corp.

The duration, or number of periods in the commanded wave, determines how long the vibration sensation is output. If a small number of high frequency periods of a waveform are commanded, it typically feels like a single "pulse" or jolt of force to the user, since the oscillatory motion occurs too quickly for the user to notice.

Such pulses can be associated with graphical objects in a graphical user interface, application program, or other displayed graphical environment. For example, when the user interacts the cursor with a graphical object, a short duration periodic waveform is preferably sent to the mouse, causing a short vibration or "pulse" to be experienced by the user. This pulse can be output when the cursor enters a graphical object or exits the object, or when the cursor moves over the middle of the object (e.g., for smaller graphical objects). Graphical objects associated with such forces can include menu items, icons, buttons, tool bars, slider thumbs, radio buttons, check boxes, and hyperlinks or other objects in a web page. Web page force sensations are described in U.S. Pat. No. 5,956,484, incorporated herein by reference in its entirety.

According to the present invention, a size of the graphical object can also be conveyed using tactile sensations. The frequency and duration of the waveform can be adjusted to convey this size. For example, when the user moves the cursor over a small menu item, a tactile sensation is output by commanding a high frequency vibration to the device which preferably has a short enough duration to convey a small number of cycles (or periods) of the vibration, such as two to five. For example, a waveform having a frequency of 125 Hz and a duration of 14 milliseconds can convey this sensation. To the user, this feels like a small jolt or pulse on the mouse which indicates the graphical object has been engaged or interacted with the cursor. As another example, the sensation of an even smaller object, such as a radio button, can be conveyed by commanding a periodic waveform having a very high frequency and a very short duration, such as 300 Hz for 5 milliseconds. These vibrations are a high enough frequency as to feel like a single jolt or pulse to the user. A low magnitude for the vibration can also be specified to enhance the "small" perception to the user, but magnitude typically is not as important as frequency, since the user is typically able to adjust the magnitude (gain) of all forces output on the mouse device. Distinguishing a small object by frequency is independent of any such gain control and thus more reliable.

When the user moves the cursor over a larger graphical object, such as a large toolbar icon or a desktop icon, a waveform having a lower frequency is preferably commanded. To convey the preferable 2–5 cycles of vibration, the waveform will typically also have a longer duration than the higher frequency waveforms for smaller graphical objects. A waveform having, for example, a frequency of 83 Hz and a duration of 25 milliseconds can be used. This provides the sensation to the user of moving the cursor over or into a large bump or other obstruction, i.e. the lower frequency and longer duration pulse conveys the feeling of a larger object.

The pulses or vibrations for different sizes of objects can be varied to a fine degree. For example, the frequency and duration of the vibrations can be adjusted in 10 Hz and 10 millisecond increments according to the size of the associated graphical object, or a more gradual adjustment can be used. When experiencing the different feels of all of the graphical objects, the user correlates the different force sensations with differently-sized objects so that the user intuitively knows the sizes of graphical objects simply by the tactile sensations associated with those objects.

In other embodiments, the frequency and duration of a commanded waveform can convey the size of associated data, application program, or other characteristic. For example, a displayed graphical icon can be associated with a file having a size in bytes. A high frequency waveform, as described above, can be commanded to output a vibration for smaller file sizes associated with icons, while lower frequency waveforms can be used to command pulses for larger file sizes. Similarly, the size or importance of an associated application program can be similarly conveyed via frequency and duration. The different pulses can also be made to convey the importance of a graphical object with regard to the preferences of a particular user.

Tactile Drawing Application Sensations

Drawing, graphics, and computer-aided design (CAD) application programs allow a user to input and edit line drawings, bitmaps, and other pictorial works displayed on the computer display device. In many types of line drawing applications, a user can move a cursor over a line, shape, or other drawing object and select the object with the cursor. The user can then manipulate or edit the object in several ways, such as move or delete the object, change the shape or facing of the object, resize the object, change the color of the object, etc.

Existing kinesthetic force feedback mouse implementations output forces in the planar degrees of freedom of the mouse and thus can provide forces that directly assist the user in selecting a desired drawing object and tracing over that object. For example, a line object can be associated with attractive forces so that when the cursor is moved within a predetermined distance of the line object, the attractive force is activated, causing the mouse to be biased in a direction toward the line object. When the cursor is positioned on or very near the line object, the attractive forces act to resist movements of the cursor away from the line object. This provides a "snap to" sensation that allows the user to select the line object more easily. In addition, the user can directly feel the shape of the line by moving the cursor along the line object. If the user moves the mouse away from the line, the forces bias the mouse back toward the line so that the user can more easily trace the line with the cursor.

Figure 3:
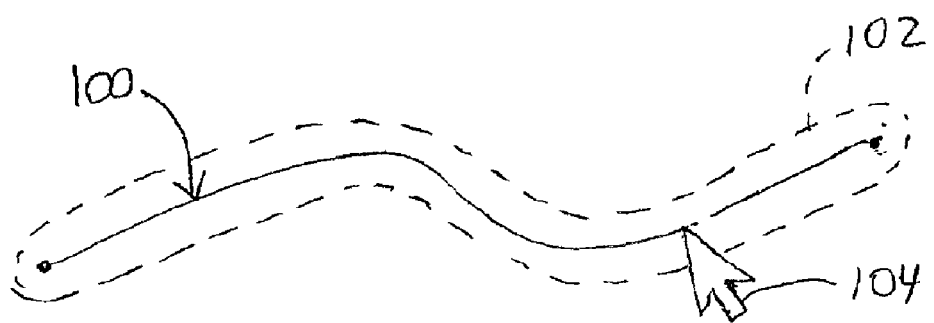
FIG. 3 is a diagrammatic view of a displayed line object and a cursor interacting with the object according to one aspect of the present invention.
Figure 4:
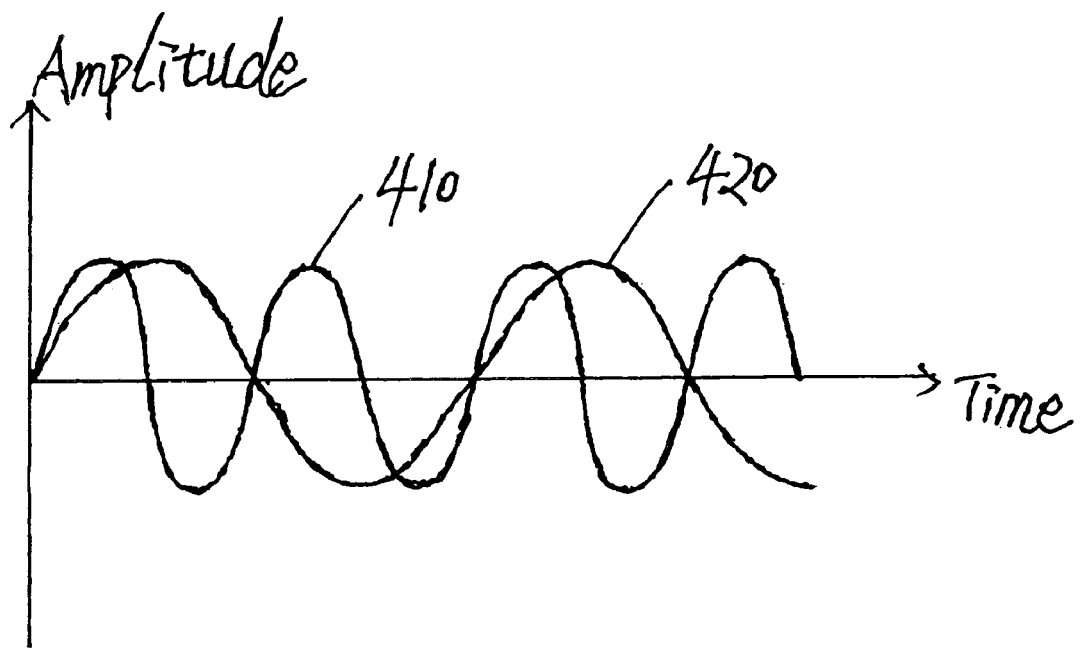
FIG. 4 depicts an example of two periodic waveforms 410, 420, where the periodic waveform 410 has a higher frequency than the periodic waveform 420 and can be associated with a graphical object having a smaller size than a size of a graphical object associated with the periodic waveform 420.
Figure 5:
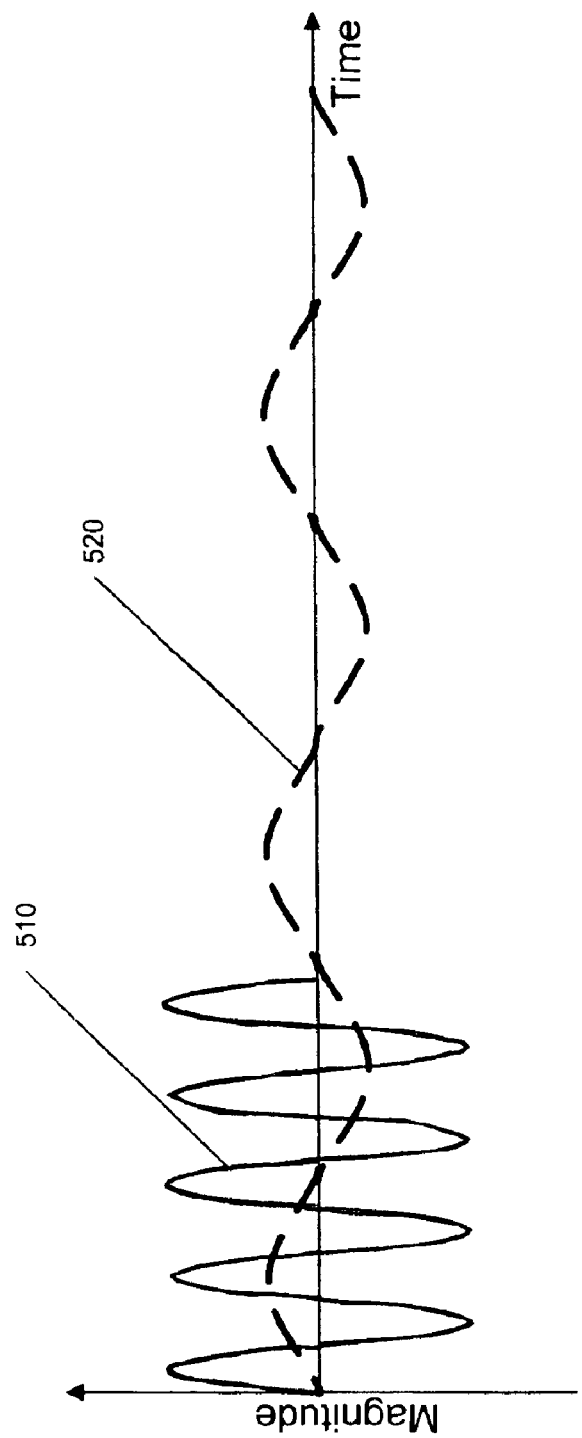
FIG. 5 depicts an example of two different haptic outputs 510, 520, where the haptic output 510 has a shorter duration and a greater magnitude than the haptic output 520.

In purely tactile haptic devices, no such attractive or snap-to forces can be output in the degrees of freedom of the mouse or other manipulandum. However, according to the present invention, forces can be output to inform and assist the user in selecting and tracing drawing objects or the like. In one preferred embodiment, when the cursor is moved within a predetermined distance of an object such as a line, the cursor is visually caused to snap to the line, i.e., the host computer displays the cursor at the line, which may cause the cursor to move on the screen without any user motion of the mouse. An example is shown in FIG. 3, which shows a line 100 displayed on a display screen. If the cursor moves within a specified distance of the line 100, indicated by dashed line 102 (preferably not displayed, but can be displayed in alternate embodiments), the cursor 104 is displayed at the line 100 as shown. The distance can vary in different embodiments, and even be specifiable by the user as one or more preferences in an application program.

In one embodiment, once the cursor is positioned on the line, the user may move the mouse to move the cursor along the line. If mouse motions cause the cursor to move along the line, then the display of the cursor is not modified. If, however, the mouse is moved in a direction that would cause the cursor to move away from the line, then the mouse input in that direction is ignored. This causes the cursor to remain on the line regardless of mouse input. For example, if the cursor is on a line that is horizontal, then mouse motion in a diagonal direction (horizontal plus vertical components) would cause the cursor to move along the horizontal line, but not in any vertical direction. Preferably, only mouse motion within a predetermined radius of the snap-to object is filtered in such a way; this radius can be the same as the entering distance (indicated by line 102), or can be made a different distance. In alternate embodiments, the cursor can be allowed to move within the area defined by line 102 before the mouse inputs are filtered or ignored (e.g. the non-line mouse motions can be ignored out to a distance from the line 100 greater than line 102).

According to the present invention, while the cursor is snapped to the line, a vibration sensation is preferably output while the cursor is engaged with the line (e.g., while the cursor is positioned to select the line). The vibration is preferably a high frequency vibration that indicates to the user that the cursor is engaged with or positioned over or near the line. The vibration can also have a lower magnitude. To the user, the line then feels as if it were a "live wire," e.g., as if he or she were touching a wire having electricity flowing through it, or as if touching a cord having sound vibrating through it. This indicates to the user that the line may be selected, but is not so strong a force sensation as to cause a disturbance to the user or impede the cursor motion. Furthermore, it is a very compelling sensation to move the cursor along the line and feel the vibration. When the cursor moves off the line, the user is immediately aware that selection is no longer possible.

In other embodiments, a different vibration can be commanded. For example, one or more of the vibration characteristics can be made proportional to the current velocity of the mouse in its workspace. In one embodiment, low mouse velocities cause a vibration having a lower magnitude and/or frequency, while higher mouse velocities cause a vibration having a higher magnitude and/or frequency.

It should be noted that other types of graphical object which are traced by the cursor can be correlated with vibrations as described above. For example, the outlines of polygons or other shapes can be implemented similarly to the line object described above. Furthermore, background lines or shapes, such as grid lines, may be associated with such haptic sensations in some applications.

Rubbery and Metallic Interactions

In many force feedback interfaces to graphical environments, it is desirable to create unique and individual haptic sensations that can indicate needed information to the user concerning an interaction of the controlled cursor with another displayed object, or concerning some other event.

One type of haptic sensation that can be both compelling and informative to the user is a "rubbery" or "metallic" sensation. To the user, these types of sensations feel like tapping a finger or a held object on a rubber-like ringing material, or a metallic ringing material, where an amount of ringing or vibration occurs after a tap. Displayed objects such as icons, menus, toolbars, hyperlinks, or checkboxes can be provided with such a feel. For example, a user may prefer a rubbery sensation when moving a cursor between menu items or when moving the cursor onto an icon.

In addition, certain types of objects can be associated with this type of haptic sensation to distinguish those types of objects from other types of objects. The rubbery and metallic feels can also be used to distinguish some interface functions from other functions, e.g. distinguishing the selection of a button from the selection of a drop down menu in an interface. Events, such as the reception of email or a calendar reminder, can also be distinguished with the rubbery or metallic feels. In some embodiments, a user can designate his or her own types of objects or instances of objects with the sensations or variations thereof. Some applications such as games or simulations can use the rubbery or metallic feels to provide particular effects when the user is interacting with objects in a graphical environment, such as when a controlled character encounters a surface or other object. Alternatively, game events can be distinguished by the rubbery or metallic sensations, such as when a player is being attacked by another player. One type of event or interaction can be provided with a rubbery feel, while another type can be provided with a metallic feel or a more standard vibration or pulse.

An effective way of providing such a rubbery or metallic feel to a displayed object for a tactile interface device is to combine a "pop" sensation with a reverberating "ring" sensation. The pop sensation is a short jolt or "pulse" of force which preferably has a high amplitude relative to the ringing sensation. The pop sensation can be implemented in many different ways. For example, a basic implementation is to move an inertial mass with a high amplitude, e.g. a high amplitude amount of current is sent to a motor for a short period of time. In other implementations, the pop can be provided by commanding one or a small number of periods of a high magnitude vibration. If a small number of high frequency periods of a waveform are commanded, it typically feels like a single "pulse" or jolt of force to the user, since the oscillatory motion occurs too quickly for the user to notice. The pop sensation is preferably output first when the cursor first interacts with the target, to signify to the user the engagement of the cursor with the target, or is output at the beginning of the event notification associated with the rubbery or metallic sensation.

A ring sensation follows the pop and provides the rubbery or metallic ringing characteristic of the sensation, e.g. while the cursor is interacting with an associated target or during an associated event. The ring is a long vibration that is of a lower magnitude than the pop to provide a more subtle effect to the user. In preferred embodiments, the ring sensation fades in magnitude over time. To achieve a metallic feel, a higher frequency vibration is preferably used for the ring sensation. To achieve a rubbery feel, a lower frequency vibration is preferably used.

Some examples of the described sensations are provided below. For a rubbery sensation associated with a graphical object (or associated with some other event), the following haptic sensations can be characterized:

pop: a short, high magnitude pulse or vibration ring: a periodic waveform having a duration of 200 milliseconds. The frequency of the waveform is preferably in the range of 125 Hz to 200 Hz. The waveform can be, for example, a square wave, sine wave, triangle wave, or other type of wave. The initial magnitude is preferably about 40% of the magnitude of the initial pop sensation. The magnitude preferably fades over the 200 millisecond period, the ending magnitude being less than 20% of the magnitude of the initial pop.

To provide a metallic haptic sensation associated with a graphical object (or another event), the following characteristics can be defined:

pop: a short, high magnitude pulse or vibration ring: a periodic waveform having a duration of about 200 milliseconds. The frequency of the waveform is preferably in the range of 300 Hz to 500 Hz. Square, sine, triangle, or other types of waves can be used. The initial magnitude is preferably about 10–20% of the magnitude of the initial pop sensation. The magnitude preferably fades over the 200 millisecond period, the ending magnitude being nearly zero.

In some embodiments, the ring sensation can start immediately after the pop sensation has been output. In other embodiments, the ring sensation can start at the same time as the pop sensation, or soon after but before the pop sensation is finished. Since the pop sensation has a very short duration, a user cannot distinguish the difference in the ring sensation start times. The most important characteristic is that a high magnitude, fast jolt is followed by the softer, fading reverberation sensation.

The sensations described above can be designed and output using such software tools and programs as Immersion Studio™ and Immersion Desktop™, available from Immersion Corp.

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the tactile sensations described herein, including joysticks, steering wheels, gamepads, and remote controls. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A method for providing a haptic sensation to a user physically contacting a haptic feedback device, said haptic feedback device communicating with a host computer implementing a graphical environment, the method comprising:
   receiving an indication of an interaction of a user-controlled cursor with a graphical object in said graphical environment; and
   enabling the output of a tactile sensation during said interaction, said tactile sensation being based on a periodic waveform and having a frequency correlated with a size of said graphical object interacted with said cursor.

2. A method as recited in claim 1 wherein said frequency of said tactile sensation is correlated with a size of a collection of data associated with said graphical object.

3. A method as recited in claim 1 wherein said frequency of said tactile sensation is correlated with a displayed size of said graphical object.

4. A method as recited in claim 1 wherein said interaction includes moving said cursor over said graphical object in said graphical environment.

5. A method as recited in claim 1 wherein said interaction includes a dragging of said graphical object by said cursor such that said graphical object moves where said cursor moves.

6. A method as recited in claim 1 wherein a magnitude of said tactile sensation is also correlated with said size of said graphical object.

7. A method as recited in claim 1 wherein said frequency correlated with said size of said graphical object includes a higher frequency for smaller graphical objects and a lower frequency for larger graphical objects.

8. A method as recited in claim 1 wherein a duration of said tactile sensation is also correlated with said size of said graphical object.

9. A method as recited in claim 8 wherein a shorter duration is correlated with smaller graphical objects and a longer duration is correlated with larger graphical objects.

10. A method as recited in claim 1 wherein said graphical object is one of an icon, window, and graphical button.

11. A method for providing a haptic sensation to a user physically contacting a haptic feedback device, said haptic feedback device communicating with a host computer implementing a graphical environment, the method comprising:
    receiving an indication of a position of a user-controlled cursor;
    causing said cursor to snap to a graphical object when said cursor is within a predetermined distance of said graphical object in said graphical environment so that said cursor is displayed touching said graphical object and said cursor can be moved along or within said graphical object based on user manipulation of said haptic feedback device; and
    enabling the output of a vibration sensation to the user while said cursor is moved along or within said graphical object.

12. A method as recited in claim 11 wherein said vibration sensation is based on a periodic waveform.

13. A method as recited in claim 11 wherein said graphical object is a line and said vibration is enabled to be output when said cursor moves along said line.

14. A method as recited in claim 11 wherein said vibration sensation has a frequency correlated to a current velocity of said haptic feedback device in at least one degree of freedom of the haptic feedback device.

15. A method as recited in claim 11 wherein said vibration sensation has a magnitude correlated to a current velocity of said haptic feedback device in at least one degree of freedom of the haptic feedback device.

16. A method as recited in claim 11 further comprising ignoring input from said haptic feedback device based on user manipulation of said haptic feedback device that would cause said cursor to move away from said graphical object.

17. A method as recited in claim 16 wherein said predetermined distance is a first predetermined distance, and wherein said input that would cause said cursor to move away from said graphical object is ignored when said input designates cursor locations within a second predetermined distance from said graphical object.

18. A method as recited in claim 17 wherein said first predetermined distance is equal to said second predetermined distance.

19. A method for providing a tactile sensation to a user physically contacting a haptic feedback device, the method comprising:
    enabling the output of a pop sensation, said pop sensation being a short, high magnitude sensation; and
    enabling the output of a ringing sensation during or immediately after said output of said pop sensation, said ringing sensation being commanded using a periodic waveform and having a longer duration and lower magnitude than said pop sensation.

20. A method as recited in claim 19 wherein said ringing sensation fades in magnitude over time.

21. A method as recited in claim 19 wherein said haptic sensation is a rubbery sensation having a ringing sensation that is commanded using a periodic waveform having a frequency of 125 to 200 Hz and a duration of about 200 milliseconds.

22. A method as recited in claim 21 wherein an initial magnitude of said ringing sensation is about 40% of a magnitude of said pop sensation.

23. A method as recited in claim 22 wherein said magnitude of said ringing sensation fades over said 200 millisecond duration, wherein an ending magnitude of said ringing sensation is less than 20% of said magnitude of said pop sensation.

24. A method as recited in claim 19 wherein said haptic sensation is a metallic sensation having a ringing sensation that is commanded using a periodic waveform having a frequency of 300 to 500 Hz and a duration of about 200 milliseconds.

25. A method as recited in claim 24 wherein an initial magnitude of said ringing sensation is 10–20% of a magnitude of said pop sensation.

26. A method as recited in claim 25 wherein said magnitude of said ringing sensation fades over said 200 millisecond duration, wherein an ending magnitude of said ringing sensation is about zero.

27. A method as recited in claim 19 wherein said haptic feedback device is in communication with a host computer that displays a graphical environment, wherein an event or interaction in said graphical environment causes said haptic sensation to be output.

28. A method comprising:
    outputting a first haptic feedback, the first haptic feedback having a duration and a magnitude; and
    outputting of a second haptic feedback associated with the output of the first haptic feedback, the second haptic feedback having a duration and a magnitude, the duration of the second haptic feedback being greater than the duration of the first haptic feedback, the magnitude of the second haptic feedback being less than the magnitude of the first haptic feedback.

29. The method of claim 28 where the first haptic feedback includes a pop sensation.

30. The method of claim 29 the second haptic feedback includes a ring sensation.

31. The method of claim 28 where the magnitude of the second haptic feedback decreases over time.

* * * * *

UNITED STATES PATENT AND TRADEMARK OFFICE
CERTIFICATE OF CORRECTION

PATENT NO. : 6,906,697 B2
APPLICATION NO. : 09/927415
DATED : June 14, 2005
INVENTOR(S) : Rosenberg It is certified that error appears in the above-identified patent and that said Letters Patent is hereby corrected as shown below:

Column 15:
In Claim 30, line 1 after The method of claim 29, insert --where--.

Signed and Sealed this

Twenty-fifth Day of July, 2006

JON W. DUDAS
*Director of the United States Patent and Trademark Office*